May 26, 1953  J. K. NORTHROP ET AL  2,639,786
CONTROLLED DECELERATION DEVICE
Filed Feb. 26, 1949  8 Sheets-Sheet 2

INVENTORS
JOHN K. NORTHROP
EDWARD C. DENZIN
DONALD B. SMITH
BY
Herbert E. Metcalf
Attorney May 26, 1953   J. K. NORTHROP ET AL   2,639,786
CONTROLLED DECELERATION DEVICE
Filed Feb. 26, 1949   8 Sheets-Sheet 8

INVENTORS
JOHN K. NORTHROP
EDWARD C. DENZIN
DONALD B. SMITH
BY Herbert E. Metcalf
Attorney Patented May 26, 1953

2,639,786

UNITED STATES PATENT OFFICE 2,639,786

CONTROLLED DECELERATION DEVICE

John K. Northrop, Hawthorne, Edward C. Denzin, Los Angeles, and Donald B. Smith, Inglewood, Calif., assignors to Northrop Aircraft, Inc., Hawthorne, Calif., a corporation of California Application February 26, 1949, Serial No. 78,554

28 Claims. (Cl. 188—62)

This invention relates to brakes, and more particularly to a linear deceleration device by which it is possible to apply controlled decelerations of high magnitude and controlled rates of deceleration to a moving body.

Demands of modern aviation have begun to exceed the limits of human tolerance for acceleration and deceleration. High speeds, accelerations, altitudes, and extreme temperature ranges make it necessary to know as precisely as possible the limits of human endurance, so that these limits can either be extended or given their due respect in the design of aircraft and included personnel equipment. The present invention is concerned particularly with linear decelerative forces of relatively short duration, such as may occur in crashing, ditching, parachute opening shock, and other similar operations. One of the first parts of the complex problem of determining these decelerations and their effects on the human body is to be able to reproduce these forces at will under controlled conditions for analysis and study.

An object of this invention is to provide a linear deceleration device with which it will be possible to apply decelerations within the range of 5 to 100 G's peak magnitude, at .01 to .5 second duration, and rates of application, or G-force rates of change .5 G per millisecond to 3 G's per millisecond or higher, to a speeding carriage capable of carrying human subjects or dummies, along with the desired equipment, where 1 G is the figure representing the acceleration of a falling body due to the pull of gravity.

Another object is to provide a friction brake which can be accurately controlled to effect any given rate, magnitude, and duration of deceleration applied to a moving vehicle or test carriage, within the limits of the apparatus. This device will directly aid in accomplishing the overall objects of conserving lives, preventing injury, and insuring efficiency of aircraft pilots and others exposed to the possibility of high linear deceleration, by providing a testing apparatus to reproduce actual conditions for investigatory purposes.

The present invention is also valuable for use in conjunction with guided missiles, many of which require initial acceleration under local power, such as can be supplied, for example, by a self-powered launching device which is separable from the missile after it has accelerated the missile to a predetermined velocity. When the missiles are relatively small, the launching devices can be made to be expendable, and are usually destroyed by ground contact after separation from the missile. However, guided missiles presently known or projected can weigh up to 30,000 pounds, thereby requiring large and complicated launching devices which are, in general, too expensive to be destroyed. If such launching devices, which are usually restrained at least over the initial portion of their travel to tracks of some type for directional launching of the missile, could be allowed to decelerate over a long extension of the initial track, then, of course, the launching device could be recovered. It is, however, highly desirable that the launching tracks be made as short as possible so that they may be portable, or mounted on moving vehicles such as ships for example. To stop launching devices in a short distance after being accelerated to high velocities requires extremely high deceleration rates.

Accordingly, it is another object of the present invention to provide a means and method of applying high decelerations to a moving device to stop said device in an extremely short distance with the device undamaged.

The present invention possesses other objects and advantages which will be noted in the description of a preferred apparatus to follow, but it is to be understood that the invention is not limited to the specific apparatus herein disclosed, since other constructions may also be utilized within the scope of the appended claims.

In broad terms, the present invention comprises a series of brake sets, preferably mounted along the path of a moving carriage, each set including a brake shoe held in a cocked position of a release mechanism against a tripping force. The cocking mechanisms can be tripped when a relatively moving brake rail arrives adjacent each shoe, thus using the tripping force to force the brake shoe against the brake rail and cause a retarding force on the carriage.

In more specific terms, the present invention is comprised of a mechanical braking system located on a section of railway type track and capable of braking or retarding a moving vehicle or carriage traversing the track at controlled rates of deceleration. The braking system consists of a multiple installation of hydraulically actuated clasp-type brakes for selective operation against braking rails attached to the moving carriage. Pre-determined quantities of brake sets are charged and retained in position to receive the carriage braking rails by release levers; brake release is attained by mechanical tripping devices carried on the carriage engaging the release levers when the carriage is in the proper position for such braking action. The braking rails rigidly attached to the carriage are several brake sets long, enabling the engagement of more than one brake set along the rail lengths at one instant. The complete series of brake sets extends for several times the length of the carriage braking rails, thus enabling the application of a constant number of brakes to the rails by replacement, i. e., as the carriage rails are progressed through the braking system, those brakes becoming disengaged at the rear of the rails are replaced with additional brakes at the front of the rails. The magnitude of deceleration force imparted to the moving carriage is controlled by varying the quantity of brakes engaging the carriage rails at any one time, limited by the maximum number of brake engagements permitted by the length of the rails.

Our invention may be more fully understood by reference to the accompanying drawings, wherein.

Figure 1:
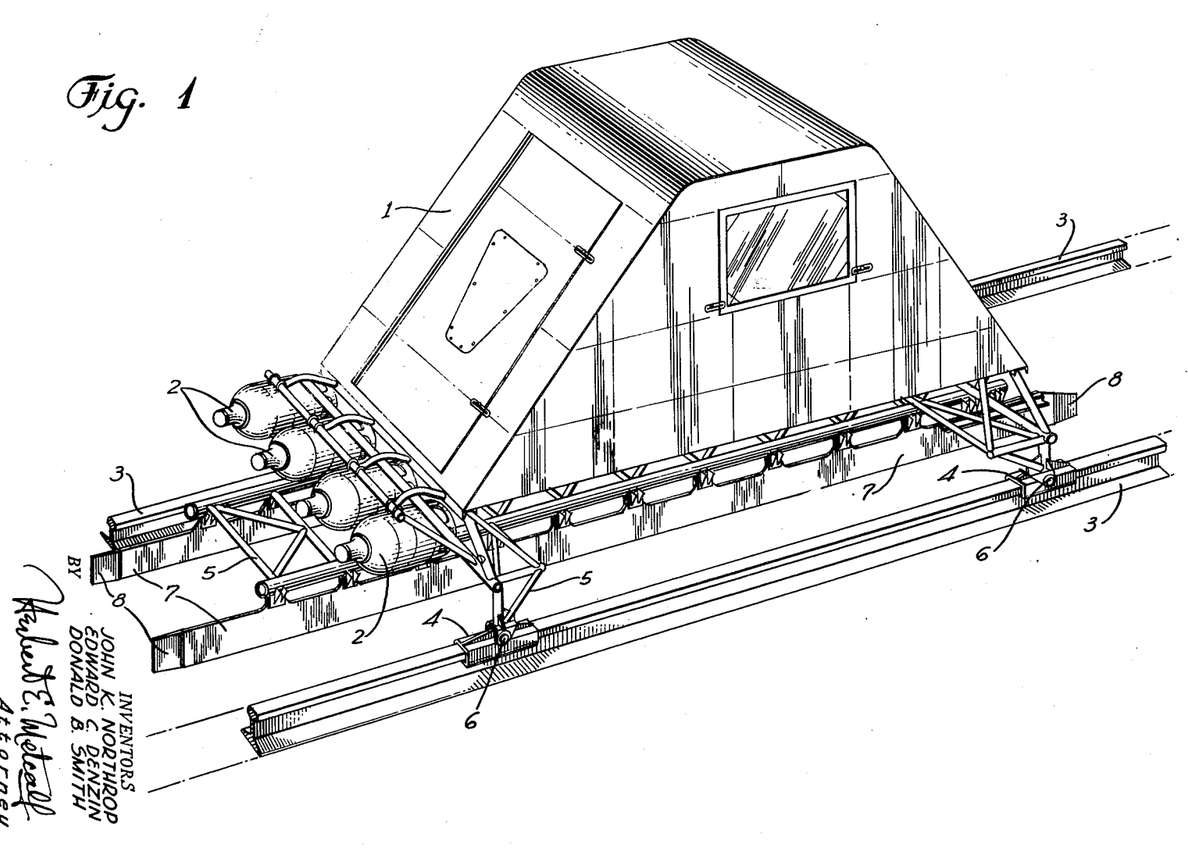
Figure 1 is a perspective view of a test carriage mounted on a track, showing two brake rails attached to the carriage.

Referring first to Figure 1, a test carriage 1 propelled by rocket motors 2 is shown mounted on a track 3. The test carriage 1 is accelerated to a predetermined velocity and is then decelerated by a braking system, yet to be described, at the completion of the rocket motors burning, during the coasting period. The carriage 1 slides along the track 3 on slippers 4 curled under the track rail to prevent the carriage from jumping off. Each slipper 4 is attached to a carriage framework 5 by means of a slipper pin 6 to assure even load distribution. These slippers are similar to those described and claimed in a co-pending application, Serial No. 47,914, filed September 4, 1948.

The carriage framework 5 carires two longitudinal brake rails 7 projecting edgewise beneath the carriage between the rails of the track 3. These brake rails 7 each comprise a flat rectangular plate of steel having a constant thickness except for a short tapered portion 8 narrowing the rail toward each end. Each rail is about 14 feet long, 5 inches deep, and 5/8 inch wide, with the constant thickness area approximately 11 feet long, the balance of the length being utilized for end tapers.

Figure 2:
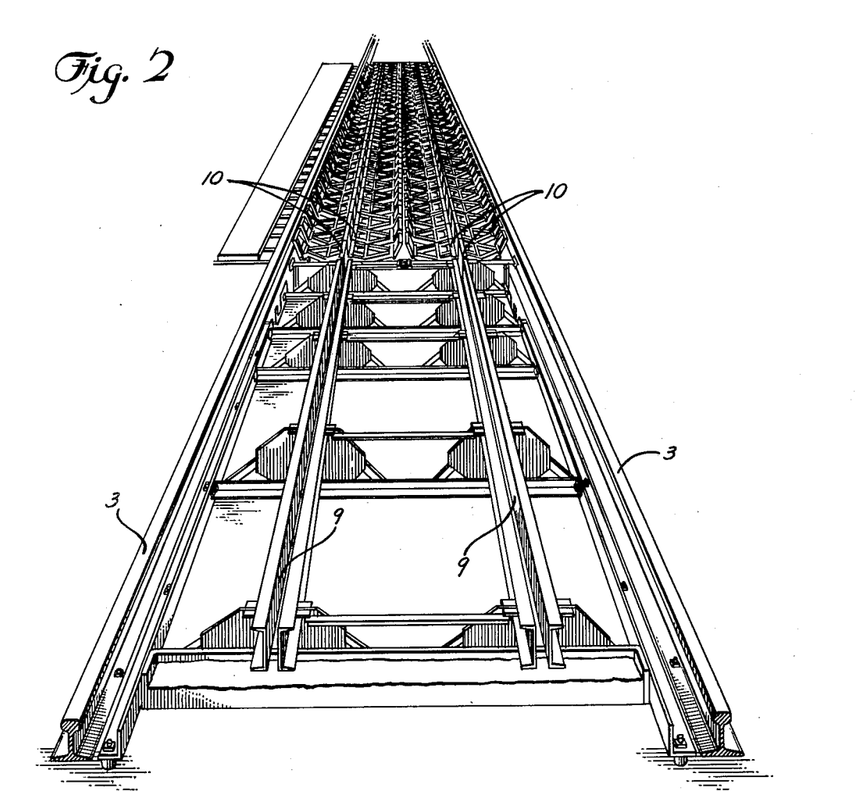
Figure 2 is a perspective view looking along the track into the braking area, showing brake rail guides and a series of brake sets.

In Figure 2 is shown the area of track 3 in which the decelerating brakes are installed. The test carriage 1 approaches from the foreground and the brake rails 7 enter two guide channels 9 which are spaced slightly wider at the entrance end than at the exit, so as to align the brake rails 7 of the carriage 1 preparatory to entering the braking mechanism.

Figure 3:
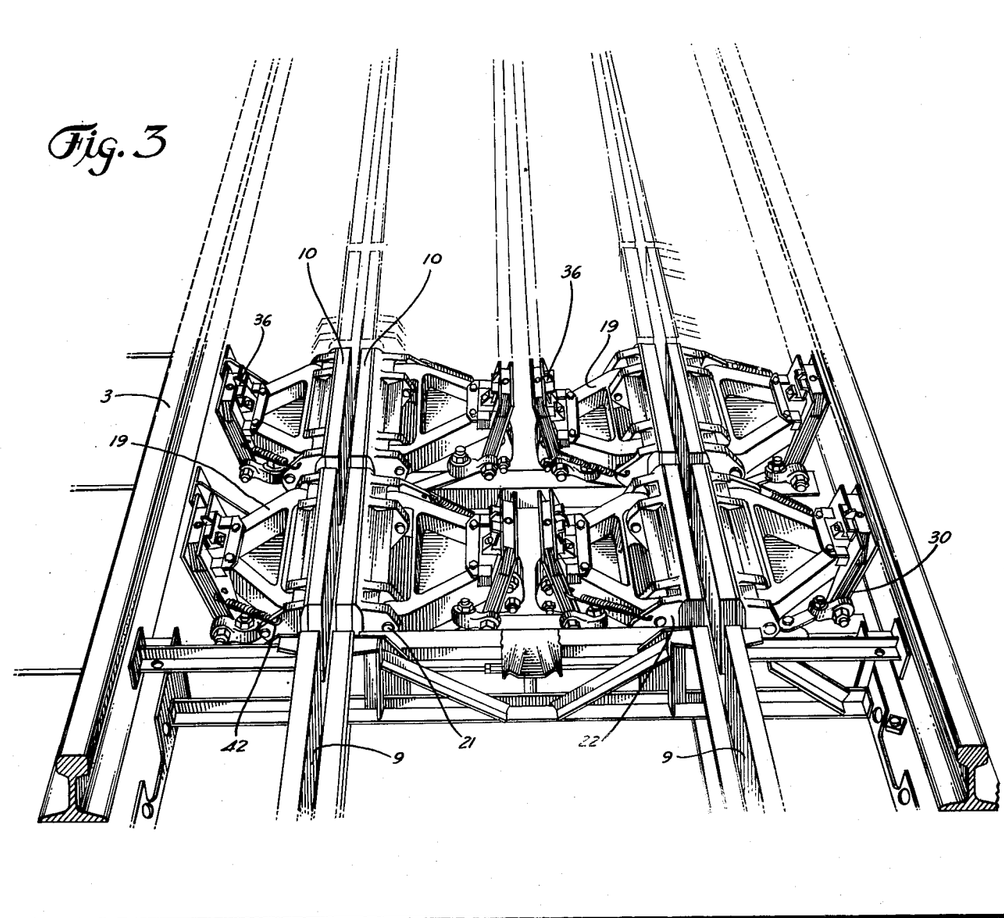
Figure 3 is a close-up perspective view of the braking area, showing four sets of brake shoes and part of the cocking mechanism of each.

A series of brake sets then follows the guide channels. Each brake set comprises two brake shoes 10 for each of the two brake rails 7, the left two being exactly identical with and placed opposite to the right two, as shown in Figure 3. Each brake shoe 10 is 1 foot long by 4 3/4 inches in width and 1 inch in thickness.

Figure 4:
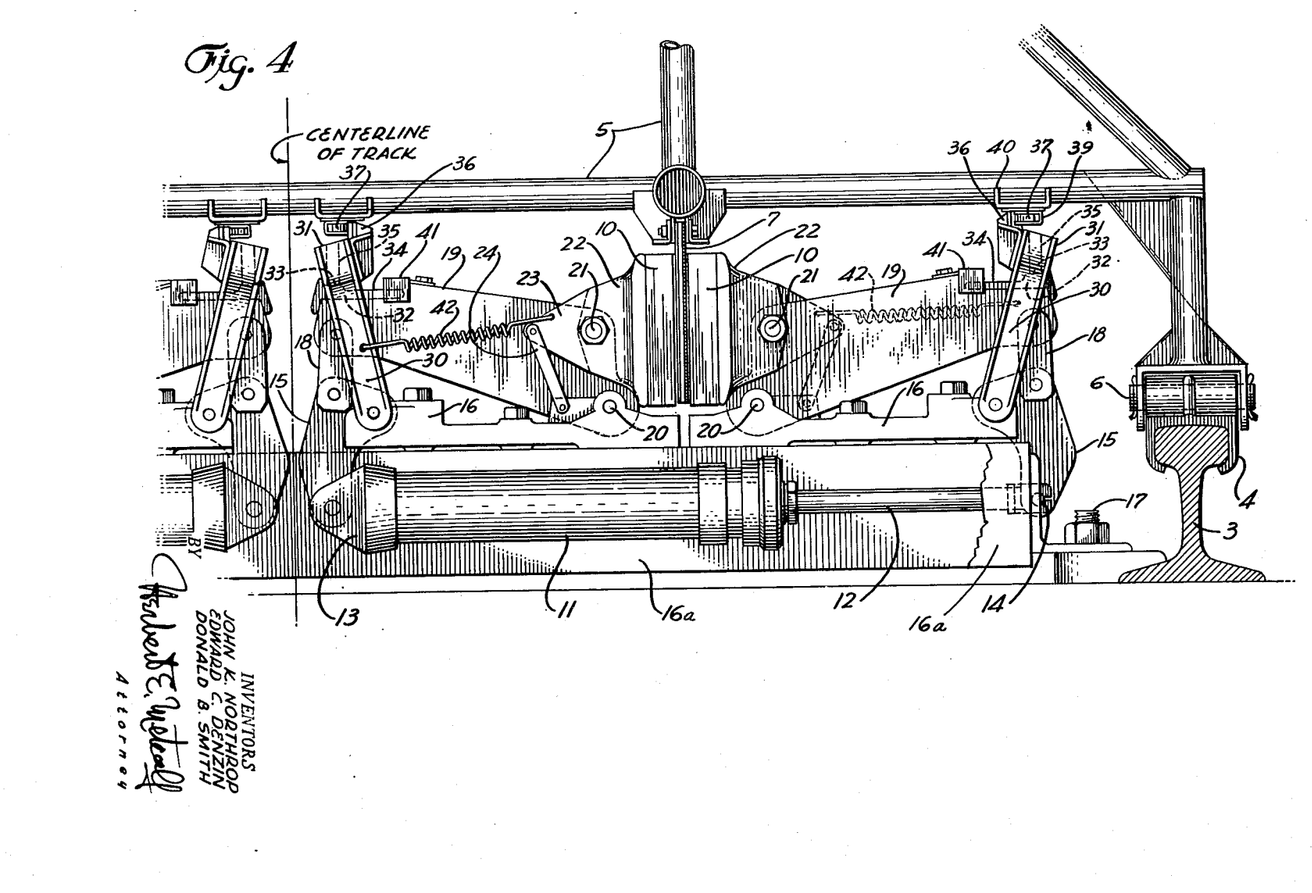
Figure 4 is a partial cross-sectional view of the track, illustrating one complete brake unit, with a carriage brake rail between the brake shoes.

A complete brake unit, having two opposed shoes, is shown in Figure 4. Here, one brake rail 7 is located between the shoes 10 which are still in the cocked position, with the carriage framework 5 overhead and one slipper 4 on the track at the right. The brake unit mechanism comprises a hydraulic brake cylinder 11, a piston rod 12 attached to the customary piston within the cylinder 11, and a mechanical linkage, yet to be described, between each end of the brake cylinder assembly and one of the two brake shoes 10. The closed end 13 of the brake cylinder 11 and a terminal fitting 14 on the piston rod 12 are each pin-connected to one of two bell cranks 15 extending upwardly and pivoted to a support 16. This support 16 is firmly attached to a structure assembly 16a anchored between the rails of the track 3 by anchor bolts 17.

Two links 18 are rotatably connected, one to the upper end of each bell crank 15 at a position to be raised when the piston rod 12 extends from the brake cylinder 11, thus rotating each bell crank 15 in opposite directions. The upper end of each link 18 connects to one of two actuating arms 19 extending inwardly toward the brake center and pivoted at its lower inner corners by means of arm pins 20 to the support 16. At the upper inner corners of each actuating arm 19, a pivot bolt 21 rotatably holds a shoe holder 22, each mounting one of the brake shoes 10 placed in opposed positions. The brake shoes 10 in this instance are made of a cast iron alloy molded over a shatterproof grid of expanded metal and attached to the shoe holders 22 by means of bolts 22a (Figure 5) passing through holes in the shoes which are countersunk to allow the bolt heads to seat below the shoe braking surface.

An outwardly extending lug 23, integral with one side of the shoe holder 22, is pin-connected to a stabilizer arm 24, in turn pin-connected at its lower end to the support 16 at a point approximately opposite the arm pin 20. The pivot bolt 21, upper and lower ends of the arm 24, and the arm pin 20 are four points which form substantially a parallelogram. It is now evident that as pressure is exerted in the brake cylinder 11 to extend the piston rod 12, the principle of action and reaction will cause both bell cranks 15 to be rotated in opposite directions, moving links 18 upwardly, rotating each actuating arm 19 about its arm pin 20, and moving each shoe holder 22 and brake shoe 10 closer together toward the brake center. The braking rails 7 of the carriage 1 when placed between the brake shoes 10 as they come together will be subjected to equal normal pressures on each side. The stabilizer arms 24 function to keep the faces of the brake shoes 10 substantially parallel when separated, and when moving, since the shoe holders 22 will move in a path determined by the combined motion of each pivot bolt 21 and the upper end of its respective stabilizer arm 24.

The foregoing linkage construction is preferably designed so that the brake cylinder pressure exerts a high mechanical advantage on the brake shoes 10. High braking forces can thus be realized with relatively low cylinder pressures or smaller cylinders.

An inverted U-shaped release lever 30 is provided at the outer end of each actuating arm 19. This release lever 30 is pivoted at its lower extremities on the support 16 on each side of the attachment of the bell crank 15. The closed upper end 31 of the release lever 30 passes over the outer upper end of the actuating arm 19 above a bearing plate 32 which is fixed to the top of the actuating arm. This bearing plate 32 has a top surface on two different levels, defining a high surface 33 and an adjacent low surface 34 located inwardly from the high surface 33.

In the farthest separated, or open, position of the brake shoes 10, actuating arms 19 are pushed downwardly at their outer ends and the release levers 30 are rotated outwardly to place a bearing screw 35 of the release lever 30 bearing directly on the high surface 33 of the bearing plate 32. This holds the brake shoes 10 in a cocked position, and brake cylinder pressure cannot force them together unless the release levers 30 are moved inwardly at the top to slide the bearing screw 35 off of high surface 33 and over low surface 34, constituting a tripping action. The actuating arms 19 are then released, permitting force transmission through the mechanism described above to the brake shoes 10 to exert pressure against the braking rails 7 of the carriage 1 when it is in such position to be braked.

Each release lever 30 is provided with a striker 36, which is bolted to the top of the release lever 30 and projects upwardly above all other parts. The decelerator brakes remain cocked until the brake rails 7 of the test carriage 1 have entered the space between the shoes 10, and then the strikers 36 are contacted by beveled cams 37 attached to the carriage framework 5, as shown in Figure 4 and the forward portion of Figure 9.

Figure 9:
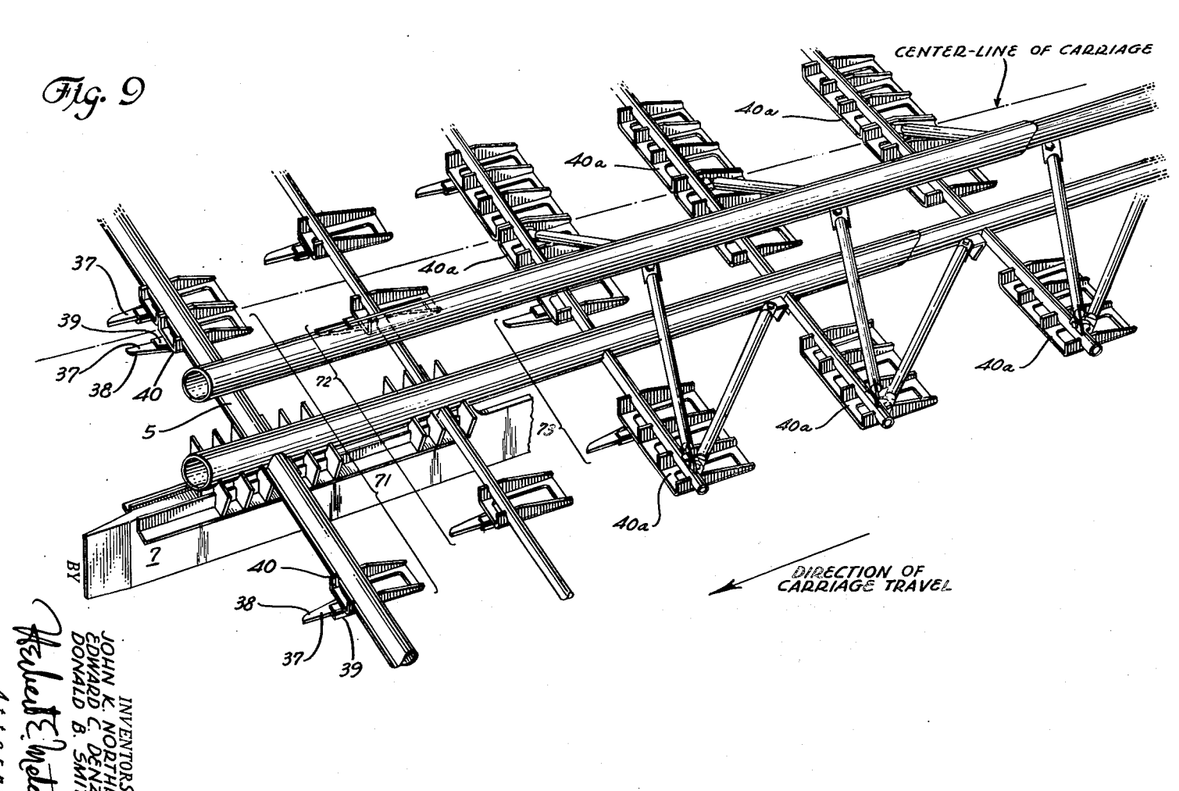
Fig. 9 is a perspective view showing the installation of cams on the test carriage used in tripping the brakes.

Each cam 37, one for each striker 36, consists of a flat metal plate, installed in a fore-and-aft position, with one edge beveled toward a point at the forward end 38. This cam 37 is bolted on a support plate 39 in turn fixed to a bracket 40 welded to the bottom of the carriage framework 5. The cams 37 are mounted in a position to place their forward ends 38 directly outside of their respective strikers 36 from the brake center, as the carriage 1 progresses, and upon further forward motion, the beveled edge of each cam 37 forces the striker 36 inwardly to trip the release lever 30 as previously described. The four release levers 30 of each brake set, two for each unit of two brake shoes, are designed to be tripped at the same time, to apply symmetrical braking forces insofar as is possible.

The brake shoes 10 will now exert a retarding force on the carriage 1 via resultant friction forces applied to the brake rails 7 until either the carriage has stopped or the brake rail 7 has passed completely beyond the shoes 10. Then, after passing, the shoes 10 will close slightly more until a completely tripped position is reached.

Figure 5:
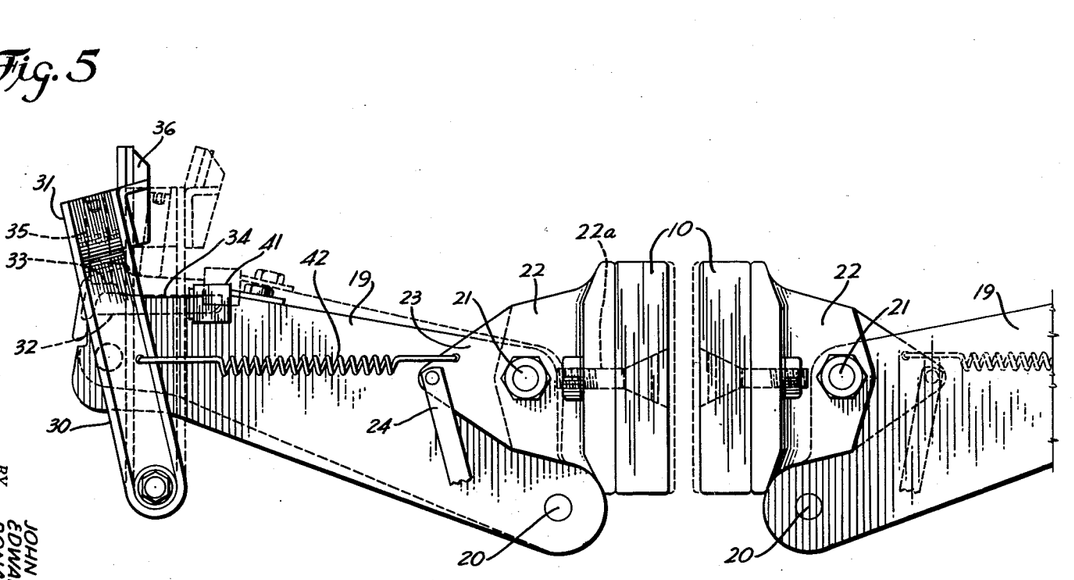
Figure 5 is an enlarged view of a brake shoe mechanism, showing the geometry of brake shoe closing motion.

When the braking rails 7 are no longer in position to resist the forces exerted by the brake shoes 10, the mechanism motion is resumed and the actuating arms 19 rotate, raising the bearing plates 32 so that they contact the bearing screw 35 at their lower surfaces 34, thus arresting the mechanism motion in the completely tripped position. The range of mechanism motion obtainable between the cocked and tripped positions is illustrated in Figure 5, the cocked position being shown by solid lines and the completely tripped position by broken lines. It will be noted that the shoes 10 are thus not allowed to close completely.

The width between shoes 10 and the width of the brake rail 7 are so related that the stroke of each shoe is sufficient to permit closure on the rail and obtain full braking pressure. The purpose of not permitting the brake shoes to come entirely together after the carriage 1 passes is to prevent damage to the brake mechanisms due to their suddenly slapping closed under the high force to which they are subjected, a matter of about 33,000 pounds in the present cases. To further minimize damage caused by the release levers 30 when released to the tripped position, a bumper assembly 41 is preferably installed at the inner end of each actuating arm bearing plate 32 to arrest their rapid rotating motion and cushion resultant forces that occur during the tripping operation.

For use on brake sets not cocked, a tension spring 42 is preferably attached from each release lever 30 to the shoe holder lug 23 for the purpose of holding release levers 30 in a clearance position such that they will not be contacted by the cams 37. On brake sets that are charged, this tension spring 42, however, is not strong enough to pull the release lever 30 inwardly from the cocked position, due to the static friction force between the actuating arm bearing plate 32 and the release lever bearing screw 35.

Figure 6:
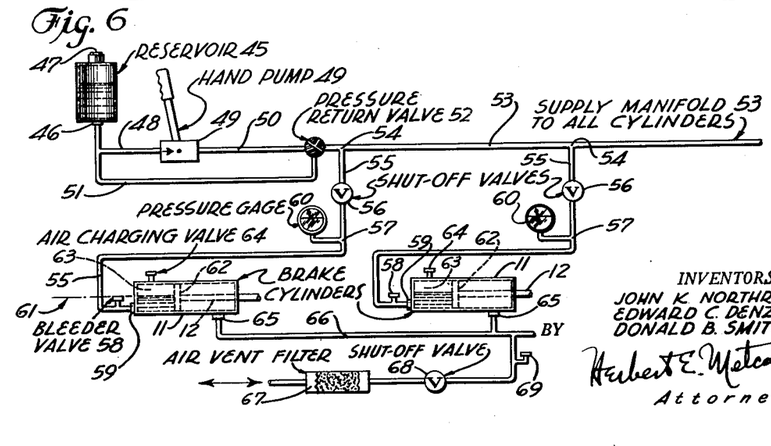
Figure 6 is a schematic diagram showing the hydraulic brake cylinder pressurizing circuit.

The hydraulic system actuating the brake set mechanisms will now be described, as shown schematically in Figure 6. One hydraulic reservoir 45 contains fluid for the entire system. A reservoir port 46 is provided in the bottom of the reservoir 45, and an air vent 47 at the top. A pump intake line 48 connects the reservoir port 46 to the inlet side of a suitable hydraulic pump 49. A pump pressure line 50 connects to the outlet side of this pump 49, and a by-pass line 51 connects the reservoir port 46 to the pump pressure line 50 at a three-way pressure return valve 52. A supply manifold 53 also connects to the pressure return valve 52.

Installed at various points along the supply manifold 53 are cylinder T's 54, one for each brake cylinder 11, and from each cylinder T 54 a fluid supply line 55 branches off to connect to the following components in the order named: a fluid shut-off valve 56, a pressure gage T 57, bleeder valve 58, and cylinder inlet port 59. A fluid pressure gage 60 is installed to communicate with each pressure gage T 57. The bleeder valve 58 connects to the top of the fluid supply line 55, and is located approximately on a level with the longitudinal center line 61 of the brake cylinder 11, which is positioned horizontally.

The cylinder inlet port 59 communicates with the fluid side of the brake cylinder 11, which is on the larger-area side of the enclosed piston 62, opposite the piston rod 12. In the upper portion of the fluid chamber 63 so formed is provided an air charging valve 64, similar to the well-known tire valve. The piston-rod side of the cylinder 11 normally contains air at only atmospheric pressure, and to maintain this condition, an air vent port 65 is connected to this side of the brake cylinder 11. To prevent dust, sand, and other foreign matter from entering the cylinder through this air vent port 65 and causing damage to the piston seals, an exhaust manifold 66 connects the vent ports 65 of all cylinders 11, and terminates in an air vent filter 67. An air shut-off valve 68 and an air inlet valve 69 are located in the exhaust manifold 66 before the vent filter 67 for purposes to be described later.

For cocking and pressurizing the brake cylinders 11, the following procedures and methods are preferably employed. The brake shoes 10 are separated to the cocked position by manually pushing down on the outer end of each actuating arm 19 and moving the release lever 30 outwardly to place the bearing screw 35 over the high surface 33 of the actuating arm bearing plate 32. With air valves 63 and 64 open, bleeder valve 58 closed, fluid shut-off valve 55 open, and pressure return valve 52 open to the pump pressure line 50 and supply manifold 53 only, hydraulic oil is pumped into the cylinder fluid chamber 63 until full. The fluid shut-off valve 56 is then closed, and the bleeder valve 58 opened to allow the oil level in the fluid chamber 63 to lower to the point where oil fills approximately half of the fluid chamber volume. When oil stops escaping through the bleeder valve 58, it is closed.

Air is then fed into the cylinder through the air charging valve 64 to obtain a pressure of roughly 80% of the final pressure desired. The fluid shut-off valve 56 is now opened, with the shut-off valves of all other cylinders closed, and the remaining 20% of the desired cylinder pressure added by means of the hydraulic pump 49. The pressure gage 60 will now read the total desired pressure, and the fluid shut-off valve 56 is again closed. This cylinder is now ready to be used in decelerating the moving carriage 1, and all other cylinders to be used are likewise prepared.

Since two brake cylinders are used in this particular embodiment at each brake station, one fluid shut-off valve 56 and one pressure gage 60 actually serves two brake cylinders 11, which are connected in parallel with each fluid supply line 55. This facilitates bleeding and charging operations, as the two cylinders are thus pressurized at the same time.

The air shut-off valve 68 in the exhaust manifold 66 is, of course, left open during the course of the test carriage run, to leave the unpressurized side of the brake cylinders 11 open to the atmosphere. The combination of air with the hydraulic fluid in the cylinders is for the purpose of maintaining the proper pressure on the brake shoes 10 after the brakes are tripped to apply the decelerating force. This air content gives an accumulator effect which prevents the cylinder pressure from dropping rapidly after only a small movement of the shoes 10, as would be the case if oil only were used. A single exterior accumulator could be used, although more stable operation and higher accuracy of predicted results, when using different combinations of brake sets, are obtained by including this air in each cylinder.

After use of the decelerator, cylinder pressure is returned to normal by opening the fluid shut-off valves 56 and turning the pressure return valve 52 to open the supply manifold 53 to the by-pass line 51. The brake sets are now ready for resetting for the next time of use. An easy way to accomplish the cocking of all brakes is to close the air shut-off valve 68 and admit compressed air through the air inlet valve 69 to force all piston and cylinder assemblies to their previous position in readiness for recharging. This procedure eliminates the necessity of individually returning each actuating arm 19 of the brake mechanism to its original position by manual effort.

At brake sets which it may not be desired to use for a particular run, their respective cylinders are made inactive by exhausting the pressure and closing the appropriate fluid shut-off valve 56.

In one particular embodiment of this invention, the test carriage weight is controlled to 1,500 pounds and the maximum velocity of the carriage at entrance into the braking area is limited to 200 miles per hour. The braking area contains 45 brake sets, giving a distance of 45 feet or more of possible deceleration. The carriage is propelled by a maximum of four 1,000 pound thrust rocket motors of 5 seconds duration each.

It is not desirable to allow the carriage 1 to come to a full stop while still in the braking area, since the coefficient of stopping, or starting, friction is considerably greater than the coefficient of sliding friction between the brake shoes 10 and the brake rails 7. This increase of coefficient of friction, and consequently the decelerating force, as a sliding body approaches zero velocity, would bring the carriage to a jolting halt at an extremely high deceleration and thus spoil the steady deceleration value which is most always desired. Therefore, all runs are designed to allow the carriage to emerge from the braking area while still traveling at a velocity around 60 miles per hour. The braking force of any of the applied brake shoes between 200 and 60 M. P. H. is practically constant. The velocity of 60 M. P. H., for the particular apparatus herein described, represents the transition velocity where the friction coefficient changes from a stable value to an increasing value.

Since the braking area of the brake rails 7 on the carriage is about 11 feet long and brake shoes 10 are about 1 foot long, a maximum possible number of exactly 11 brake sets can be actively engaged at any one time. Many different deceleration values and durations can be obtained by cocking various combinations of the brake sets along the braking length of 45 total sets. After the brake characteristics have become known, by means of trial runs during which data is taken by suitable instrumentation, predictions on brake performance can be made with a good degree of accuracy.

To illustrate the method of selecting brake shoe combinations for various values of deceleration, a few examples will be given as applicable to this particular invention embodiment. In practice, it was found that one brake set acting steadily on the test carriage mass via the brake rails renders a deceleration of approximately 5 G's. This figure will be assumed in the following discussion. Therefore, decelerations in increments of 5 G's from 5 to 55 G's may be obtained, depending upon how many brake sets are simultaneously active on the brake rails.

Figure 7:
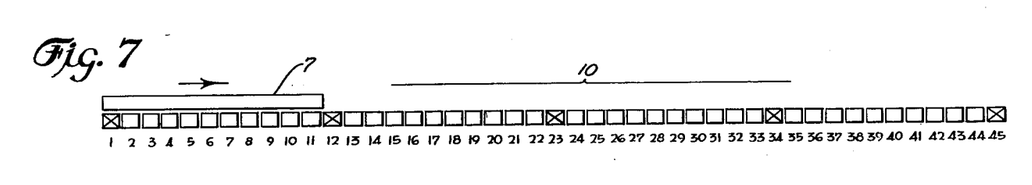
Figure 7 is a block diagram showing the basic relationship of brake shoes to brake rail.

Referring to Figure 7 for the basic theory of the present invention, 45 consecutive brake sets are illustrated, with a brake rail 7 exactly 11 sets in length represented as being positioned within the first 11 sets just after completely entering the braking area. Brake sets number (1), (12), (23), (34), and (45) are marked to indicate those which were cocked and are to act as brakes, the remainder staying open. Since brake set (1) was tripped, and up to the position now occupied by the rail 7, it has experienced a constant deceleration. As it continues the decelerated motion into brake set (12), this set will be tripped as previously described, just as the rear of the rail 7 is leaving set (1), thus keeping exactly one brake set in contact with the brake rail during the time the rail is advancing one brake set forward from the position shown in Figure 7. When brake set (12) is 100% active on the rail 7, brake set (1) has been passed, leaving set (12) as the only active brake and still giving the same constant deceleration to the carriage carrying the brake rail.

This uniformly decelerated motion continues, brake set (23) taking the place of set (12) in the same manner as described, and so on, until the rear of the carriage passes beyond brake set (45), at the end of the braking area. A sufficiently high entrance velocity has been assumed, to allow the carriage to pass completely through the 45 brake sets before stopping. A carriage deceleration vs. carriage displacement graph for this example would take form of curve #1 in Figure 8.

Figure 8:
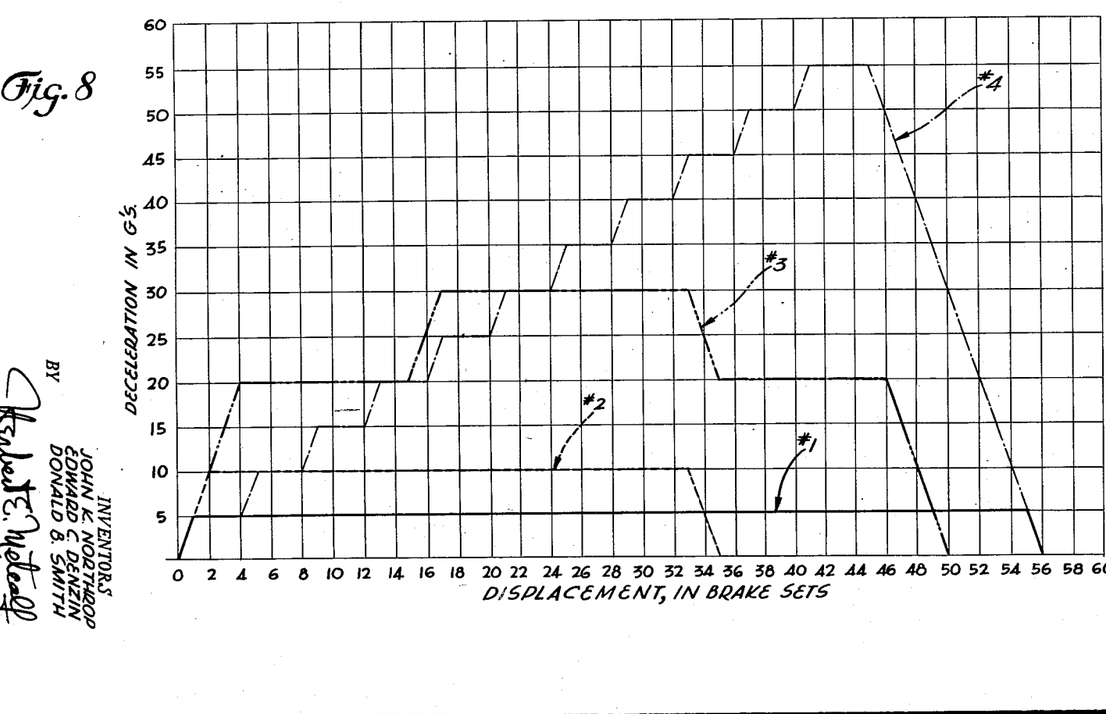
Figure 8 is a graph of deceleration as the ordinate plotted against linear displacement as the abscissa, showing examples of braking configurations.

If a uniform deceleration of 10 G's is required, over a shorter distance, for example, brake sets number (1), (2), (12), (13), (23), and (24) might be cocked and pressurized, while the others are made inactive. This will be similar to the preceding example except that two brake sets will be acting on the rail simultaneously. In Figure 8, curve #2 represents this condition.

Again, if an initial deceleration of 20 G's is desired, followed by an increase to 30 G's for a short period, and another short period of 20 G's before emerging from the braking area, the following brake sets may be prepared for use: (1), (2), (3), (4), (12), (13), (14), (15), (16), (17), (23), (24), (25), (26), (27), (28), (36), (37), (38), and (39). The general shape of the resulting deceleration-displacement diagram for this condition is shown by curve #3 in Figure 8.

Curve #4 shows another example of the deceleration patterns which can be obtained. For this instance, the following brake sets would be used: (1), (5), (9), (12), (13), (16), (17), (20), (21), (23), (24), (25), (27), (28), (29), and (31) through (45).

In operation of the decelerator, it has been found that the rate of increase of deceleration of the test carriage obtained by tripping one complete brake set amounts to approximately 1 G per millisecond. Provisions are made to vary this rate of deceleration onset, comprising means to simultaneously trip two or more brake sets.

In the embodiment shown in Figure 9, three pairs of cams are provided for each brake rail 7. Pair No. (1) 71 is installed identically with the cams 37 previously described. Pair No. (2) 72 is installed exactly one brake shoe length behind pair No. (1) 71, in the same horizontal plane, but each cam of this pair is offset inwardly toward the brake rail 7. Pair No. (3) 73 is similarly installed one brake shoe length behind pair No. (2) 72, with its cams each offset inwardly from pair No. (2) by an equal distance.

At the brake mechanisms on the ground (Figure 10), brake set No. (3) carries a striker 36 on each release lever 30 identical with the strikers 36 previously described. Brake set No. (2) carries offset strikers 36a located in the same horizontal plane as strikers 36 but offset inwardly toward the brake rail 7 by the same amount that cam pair No. (2) 72 is offset inwardly from cam pair No. (1) 71. Similarly, brake set No. (1) carries displaced strikers 36b located inwardly from offset strikers 36a by the same amount that cam pair No. (3) 73 is offset inwardly from cam pair No. (2) 72.

Figure 10:
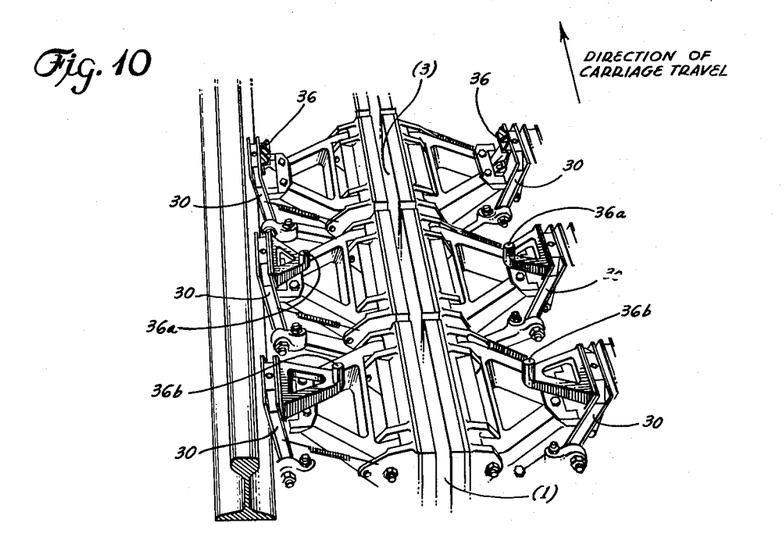
Figure 10 is a perspective view of one side of the braking area, showing the installation of cam-operated strikers on the brake units.

Thus, it is easily seen that as the brake rail 7 enters brake set No. (1), no brake will be applied, since cam pair No. (1) 71 does not contact displaced strikers 36b, therefore leaving them cocked. By the same token, as brake rail 7 enters brake set No. (2), no brake will be applied, since cam pair No. (1) 71 does not contact offset strikers 36a in passing; neither does cam pair No. (2) 72 contact displaced strikers 36b.

Now, as the brake rail 7 enters brake set No. (3), the various cams and strikers are spaced so that strikers 36, 36a, and 36b are simultaneously contacted by cam pair No. (1) 71, pair No. (2) 72, and pair No. (3) 73, respectively, thereby tripping brake sets No. (1), (2), and (3) simultaneously. The rate of deceleration rise is, therefore, tripled over that which would occur if only one brake set were tripped at a time. The amount of offset is regulated so that the release levers of brake sets No. (3) and No. (2), which have been tripped, will not be struck by cam pair No. (2) 72 or pair No. (3) 73 in passing. Figures 9 and 10 illustrate only these offset provisions for one brake rail. The other brake rail, if any, is, of course, provided with similar tripping arrangements symmetrical to those shown.

Beside cam pair No. (3) 73, other cam brackets 40a are provided, to which cams may be bolted to give other types of deceleration. Other sets of cam brackets 40a are likewise shown, each positioned one brake length behind the preceding set. Additional cams, support plates, and brackets, can be added as desired, and strikers which are offset yet farther can be employed to provide for the simultaneous tripping of more than three brake sets.

The same result of tripping two or more brake sets simultaneously can be obtained by reversing the direction of cam offset and reversing the positions of the various strikers so as to place cam pair No. (1) 71 nearest the brake rail 7 and cam pair No. (3) 73 on the outside. Therefore, this invention is not deemed to be limited to the specific direction of cam offset shown herein.

Figure 11:
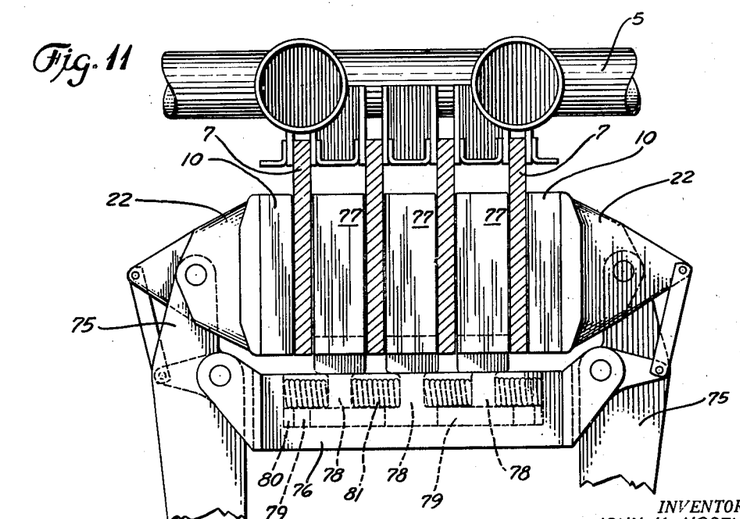
Figure 11 is a cut-away end elevation view, partly sectional, showing a brake unit embodying multiple-surface contacts via both actuating and floating type brake shoes.

Another feature of the present invention is shown in Figure 11, wherein multiple-surface brake units are provided. Each brake shoe holder 22 is pivoted on the upper end of one of two lever arms 75 which are each rotatably mounted on a cross frame 76 holding the lever arms 75 a fixed distance apart near their upper ends. Brake shoes 10 attached to the shoe holders 22 are forced toward each other when the lower ends of the lever arms 75 are separated by means not shown.

Spaced between the two brake shoes 10 are three brake blocks 77 of the same composition as the brake shoes 10. Each brake block 77 is mounted on a post 78 having forked legs 79 which slide freely between the forked legs of the adjacent post 78. All posts rest in a dished out interior 80 of the cross frame 76, and are spaced laterally by means of compression springs 81 acting between each post 78 and the adjacent post or side of the cross frame 76.

Provisions are thus made for four brake rails 7 to be acted on by this brake unit. The normal width of each brake rail space, between brake surfaces, is exactly equal to the brake rail width when the units are cocked and prepared for tripping. Hence, practically no movement of the brake shoes 10 or blocks 77 occurs when the brakes are tripped to squeeze upon the rails. Compression springs 81 act to allow a slight movement of each brake block 77 to equalize pressures which may otherwise differ due to slight misalignment of rails 7 or machining tolerances of brake units. As in the previously described single-rail unit, each rail 7 is tapered toward a point for a short distance from each end, to allow smooth entrance into the brake. Further, brake area entrance guides similar to guide channels 9 previously described may be located on the up-track side of the first unit to be entered, to assure alignment of the carriage carrying the brake rails 7 to the desired point of engagement.

The specific apparatus of this invention herein disclosed utilizes a 2,000 foot length of standard-gauge railway rail. The test carriage 1 is accelerated from rest at a predetermined location from the starting end of the track 3. Entrance to the braking area is located 1,250 feet from the starting end. The braking area extends for approximately 47 feet, and beyond that is a coasting space ending at an arresting gear provision located 200 feet from the finish end of the track 3. After leaving the braking area at a velocity in the neighborhood of 60 M. P. H., as mentioned before, the test carriage 1 will normally come to rest within the coasting space (503 feet). The arresting gear thus functions as an emergency brake should the decelerator fail to operate properly, and also can be used as a normal stopping device after planned runs where the exit velocity is higher than 60 M. P. H.

However, when it is desired to stop a carriage in as short a distance as possible, as in the case of a carriage that had just been used to launch a guided missile, for example, the brakes are arranged and set to bring the carriage to a full stop within the brake assembly. In this latter case, uniform deceleration does not extend into the velocities approaching zero, but the variation at these low velocities is unimportant for such a use of the device.

To summarize briefly the method of controlling the decelerated motion of the test carriage, high values of deceleration are obtained by causing more brake units to be active on the brake rails at any one time, or by providing multiple-surface brakes. High rates of deceleration are obtained by applying more of the initial brake sets simultaneously. Long durations of deceleration are obtained by adding more brake sets in series to expand the braking area. Many combinations of these functions are predicted and set up by varying the positions of the brake sets to be tripped, according to predetermined patterns.

Thus it is seen that the present invention provides a linear decelerator which will duplicate any manner of deceleration within its unlimited range. It is capable of a variety of uses in addition to those described herein, such as, for example, an elevator brake installed along the sides of the elevator shaft.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

We claim:

1. A decelerator comprising a brake rail member, two brake shoe members having motion relative to said rail member along a specified path on which said rail member and said shoe members lie, said rail member having a given length, said shoe members being spaced by exactly said rail length, and means for forcing each of said shoe members against said rail members with substantially equal retarding forces by means of sliding friction, when said shoe members are adjacent said rail member, whereby, when said relative motion is of sufficient initial magnitude, a substantially constant relative deceleration between said shoes and said rail is effected from the time the first of said shoes becomes active on said rail until the second of said shoes is separated from said rail.

2. A decelerator comprising two identical brake shoe members having motion relative to a brake rail member along a specified path on which said shoe members and said rail member lie, said rail member having a given length, said shoes being spaced center to center by exactly said rail length parallel to the extent of said rail member, power means connected to move each of said shoes to a tripped position, said tripped position arranged to cause sliding friction between said shoe and said rail member when said rail member is beside said shoe, and said power means having substantially equal forces against said shoes, cocking means movable to hold each of said shoes in a cocked position against the potential energy of said power means, and tripping means having a fixed position relative to said rail member, said tripping means being positioned to individually move each of said cocking means to trip its associated shoe member when said relative motion brings the leading end of said rail member beside said shoe member, whereby, when said relative motion is of sufficient initial magnitude, a substantially constant relative deceleration between said shoes and said rail is effected from the time that the first of said shoes is tripped until the second of said shoes is separated from said rail.

3. Decelerator means for acting on a moving body carrying a brake rail, which comprises two identical pairs of spaced opposed brake shoes, said pairs being located in line to be entered by said brake rail and spaced center to center by exactly one brake rail length, power means connected to force together the brake shoes of each of said pairs when such pair is tripped, said power means having substantially equal forces against said pairs, and tripping means carried by said moving body, said tripping means being positioned to individually trip each of said pairs when the forward end of said rail enters such pair, so that said power means closes said tripped pair in frictional contact with opposite sides of said rail, whereby, when the initial velocity of said moving body is of sufficient magnitude, a substantially constant decelerative force is applied to said rail between the time that the forward end of said rail enters the first of said pairs of brake shoes and the time that the rear of said rail leaves the second of said pair.

4. Decelerator means for acting on a moving body carrying a brake rail, which comprises a plurality of identical pairs of spaced opposed brake shoes, said pairs being located in line to be entered by said rail and spaced center to center parallel to the extent of said rail member by exactly one brake rail length, power means connected to force together the shoes of each of said pairs with substantially equal forces on each of said pairs when such pair is tripped, and tripping means carried by said moving body, said tripping means being positioned to individually trip each of said pairs when the forward end of said rail enters such pair, so that said power means closes said tripped pair in frictional contact with opposite sides of said rail, whereby, when the initial velocity of said moving body is of sufficient magnitude, a substantially constant decelerative force is applied to said rail between the time that the forward end of said rail enters the first of said pairs of shoes and the time that the rear of said rail leaves the last of said pairs.

5. A decelerator comprising a brake rail having a given length carried by a moving body, a plurality of identical pairs of spaced opposed brake shoes mounted on a stationary support, said pairs being located in line to be entered by said brake rail and each spaced center to center by exactly said rail length, power means connected to force together the brake shoes of each of said pairs with substantially equal forces on each of said pairs when such pair is tripped, and tripping means, also carried by said moving body, positioned to trip each of said pairs of shoes when the forward end of said rail enters such pair, so that said power means closes said tripped pair in frictional contact with opposite sides of said rail, whereby, when the initial velocity of said body is of sufficient magnitude, a substantially constant decelerative force is applied to said rail between the time that the forward end of said rail enters the first of said pairs of brake shoes and the time that the rear of said rail leaves the last of said pairs.

6. A decelerator comprising a brake rail member, having a given length, a plurality of brake shoe members having motion relative to said rail member along a specified path on which said rail member and said shoe members lie, said shoe members being spaced as close together as practicable, said rail member length being an integral multiple of the distance between any point on one of said shoe members and the corresponding point on the adjacent shoe member, and means for forcing each of said shoe members against said rail member with substantially equal retarding forces by means of sliding friction, when each of said shoe members is beside said rail member, whereby, when said relative motion is of sufficient initial magnitude, a substantially constant relative deceleration between said shoes and said rail is effected throughout the time that the maximum possible number of said shoes is frictionally active on said rail member.

7. A decelerator comprising a plurality of brake shoe members having motion relative to a brake rail member along a specified path on which said shoe members and said rail member lie, said rail member having a given length, said shoes being spaced as close together as practicable, the distance between any point on one of said shoe members and the corresponding point on the adjacent shoe member being contained an integral number of times in said rail length, power means connected to move each of said shoes to a tripped position, said tripped position arranged to cause sliding friction between said shoe and said rail member when said rail member is beside said shoe, cocking means movable to hold each of said shoes in a cocked position against the potential energy of said power means, and tripping means having a fixed position relative to said rail member, said tripping means being positioned to selectively move any of said cocking means to trip its associated brake shoe member when said relative motion brings the leading end of said rail member beside said shoe member, whereby, when said relative motion is of sufficient initial magnitude, a predetermined relative deceleration between said shoes and said rail is effected throughout the time that any of the selected shoes tripped is frictionally active on said rail member.

8. A decelerator comprising a brake rail having a given length, carried by a moving body, a plurality of pairs of spaced opposed brake shoes mounted on a stationary support, said pairs being located in line to be entered by said brake rail and each spaced as close together as practicable, said rail length being an integral multiple of the distance between any point on one of said pairs of shoes and the corresponding point on the adjacent pair, power means connected to force together the brake shoes of each of said pairs when such pair is tripped, and tripping means, also carried by said moving body, positioned to trip selected pairs of shoes when the forward end of said rail enters such pair, so that said power means closes said selected pairs in frictional contact with opposite sides of said rail, whereby, when the initial velocity of said body is of sufficient magnitude, a predetermined decelerative force is applied to said rail during the time when any of the selected pair of shoes tripped is frictionally active on said brake rail.

9. Apparatus in accordance with claim 2 wherein each of said power means is a hydraulic piston and cylinder assembly in which the working hydraulic pressure is supplemented by gas pressure to produce an accumulator effect.

10. Apparatus in accordance with claim 2 wherein each of said power means is a hydraulic piston and cylinder assembly wherein the working medium within said cylinder comprises a volume of relatively non-compressible fluid and a volume of compressible fluid, whereby an accumulator effect is provided.

11. A decelerator comprising a first plurality of brake shoe members having motion relative to a brake rail along a specified path on which lie said shoe members and said rail member, said rail member having a given length, said shoes being spaced center to center by exactly said rail length, a second plurality of similar brake shoe members also spaced center to center by exactly said rail length and located along said path alternately of said first plurality, the first shoe of said second plurality being fixed immediately following the first shoe of first said plurality, power means connected to move each of said shoes to a tripped position, said tripped position arranged to cause sliding friction between said shoe and said rail member when said rail member is beside said shoe, cocking means movable to hold each of said shoes in a cocked position against the potential energy of said power means, tripping means having a fixed position relative to said rail member, said tripping means being positioned to individually move each of said cocking means except that associated with the shoe member nearest the relatively approaching rail member to trip its associated shoe member when said relative motion brings the leading end of said rail member beside such a shoe member, additional tripping means also having a fixed position relative to said rail member, said additional tripping means being positioned to move that cocking means associated with the shoe member nearest the relatively approaching rail member to trip its associated shoe member simultaneously with the second nearest shoe member, whereby, as the leading end of said rail member arrives beside said second nearest shoe member, said first and second nearest shoes will be simultaneously tripped to act on said rail member, and as said relative motion continues, each succeeding shoe will be likewise tripped just as a previously tripped shoe becomes inactive by reason of its separation from said rail member, thus constantly maintaining a total of two active shoes within the extent of said decelerator.

12. A decelerator comprising a first plurality of brake shoe members having motion relative to a brake rail member along a specified path on which lie said shoe members and said rail member, said rail member having a given length, said shoes being spaced center to center by exactly said rail length, additional similar pluralities of brake shoe members located along said path, the shoe members of each said additional plurality also being spaced center to center by exactly said rail length, the first shoe of each of said additional pluralities being fixed between the first and second shoes of first said plurality of shoes, power means connected to move each of said shoe members to a tripped position, said tripped position arranged to cause sliding friction between said shoe and said rail member when said rail member is beside said shoe, cocking means movable to hold each of said shoes in a cocked position against the potential energy of said power means, and tripping means having a fixed position relative to said rail member, said tripping means being positioned to simultaneously move each of those cocking means associated with the first shoe member of each plurality to trip said first shoe members simultaneously when said relative motion brings the leading end of said rail member beside the last of said first shoes, a portion of said tripping means being positioned to individually move each of those cocking means associated with the remaining shoe members to trip its associated shoe member when said relative motion brings the leading end of said rail member beside such a remaining shoe member, whereby, after the initial rapid rise of deceleration caused by the simultaneous tripping of said first shoes, each succeeding shoe member will be individually tripped and become active just as a previously tripped shoe becomes inactive by reason of its separation from said rail member, thus maintaining a constant total number of active shoes until no more shoes are available to be tripped on the leading end of said rail.

13. A decelerator comprising a brake rail member having a given length, a first plurality of brake shoe members having motion relative to said rail member along a specified path on which lie said shoe members and said rail member, said shoe members being spaced center to center by exactly said rail length, a second plurality of similar brake shoe members also spaced center to center by exactly said rail length and positioned along said path alternately of said first plurality, the first shoe of said second plurality being fixed immediately following the first shoe of said first plurality, power means connected to move each of said shoe members to a tripped position, cocking means movable to hold each of said shoe members in a cocked position against the potential energy of said power means, tripping means positioned to trip each of said cocking means except that associated with the shoe member nearest the relatively approaching rail member to release their respective shoe members from said cocked positioned when said relative motion brings the leading end of said rail member adjacent such a shoe member where said tripped position causes sliding friction between said rail member and that shoe member, and additional tripping means positioned to likewise trip that cocking means associated with the shoe member nearest the relatively approaching rail member simultaneously with the second nearest shoe member.

14. A decelerator comprising a brake rail member having a given length, a plurality of brake shoe members having motion relative to said rail member along a specified path on which lie said shoe members and said rail member, said shoe members being spaced center to center by exactly said rail length, additional similar pluralities of brake shoe members located along said path, the shoe members of each said additional plurality also being spaced center to center by exactly said rail length, the first shoe of each of said additional pluralities being fixed between the first and second shoes of first said plurality of shoes, power means connected to move each of said shoe members to a tripped position, cocking means movable to hold each of said shoes in a cocked position against the potential energy of said power means, and tripping means positioned to simultaneously trip each of those cocking means associated with the first shoe member of each plurality to release their respective shoe members from said cocked position when said relative motion brings said rail member adjacent the last of said first shoes where said tripped position of said first shoes causes sliding friction between said tripped shoes and said rail member, a portion of said tripping means being positioned to individually trip each of those cocking means associated with the remaining shoe members when said relative motion brings said rail member adjacent such a remaining shoe member where it will likewise become active on said rail member.

15. A decelerator comprising a brake rail having a given length carried by a moving body, a first plurality of pairs of spaced opposed brake shoes mounted on a stationary support, said pairs being located in line to be entered by said brake rail and spaced center to center by exactly said rail length, a second plurality of similar pairs of spaced opposed brake shoes also spaced center to center by exactly said rail length and located in line to be entered by said brake rail alternately of said first plurality, the first pair of said second plurality being fixed immediately following the first pair of said first plurality, power means connected to force together the brake shoes of each of said pairs when such pair is tripped, tripping means, also carried by said moving body, positioned to trip each of said pairs of shoes except that pair nearest the approaching brake rail when the forward end of said brake rail enters such pair, and additional tripping means carried by said moving body positioned to likewise trip that pair of shoes nearest the approaching brake rail simultaneously with the second nearest pair of shoes.

16. Apparatus in accordance with claim 11 wherein that cocking means associated with said nearest shoe member carries a striker positioned to be contacted by said additional tripping means, and wherein that cocking means associated with said second nearest shoe member carries an offset striker positioned to be contacted by first said tripping means simultaneously with the contacting of first said striker by said additional tripping means.

17. Apparatus in accordance with claim 13 wherein that cocking means associated with said nearest shoe member carries a striker positioned to be contacted by said additional tripping means, that cocking means associated with said second nearest shoe member carries an offset striker positioned to be contacted by first said tripping means, said additional tripping means comprises a cam member stationary with respect to said rail member and having an edge at an angle to said path of relative motion to exert a component of force on said striker, said first tripping means comprises an offset cam member similar to first said cam member but located one brake shoe length forward of said first cam member and offset laterally from said first cam member in the same direction and by the same amount that said offset striker is offset from said first striker, whereby when said relative motion brings said rail member adjacent said second nearest shoe member, said first cam member will contact said first striker simultaneously with the contacting of said offset striker by said offset cam member, thereby tripping said nearest shoe member and said second nearest shoe member simultaneously.

18. Apparatus in accordance with claim 15 wherein that power means connection associated with said nearest pair of brake shoes is provided with a striker positioned to be contacted by said additional tripping means, that power means connection associated with said second nearest pair of shoes is provided with an offset striker positioned to be contacted by first said tripping means, said additional tripping means comprises a cam member having an edge at an angle to said path of relative motion to exert a component of force on said striker, said first tripping means comprises an offset cam member similar to first said cam member but located one brake pair length forward of said first cam member in the same direction and by the same amount that said offset striker is offset from said first striker, whereby when said rail member enters said second nearest pair of shoes, said first cam member will contact said first striker simultaneously with the contacting of said offset striker by said offset cam member, thereby tripping said nearest pair of brake shoes and said second nearest pair simultaneously.

19. A decelerator comprising a movable body, a brake rail member carried by said body and having a given length, a plurality of brake shoe members spaced over a length longer than that of said rail member, said rail member moving adjacent said shoe members along a specified path, power means connected to move each of said shoe members to a tripped position, cocking means connected to hold each of said shoe members in a cocked position against the potential energy of said power means, means for conditioning selected cocking means for tripping thereof, and tripping means positioned to trip each of the conditioned cocking means to release the connected shoe members from said cocked position when said rail member arrives adjacent a shoe member to be released in a position where the released shoe member will apply sliding friction between said rail and said released shoe member, whereby controlled relative deceleration is attained in accordance with the arrangement of the conditioned cocking means.

20. Apparatus in accordance with claim 19 wherein said tripping means is mounted on said body.

21. Apparatus in accordance with claim 19 wherein said tripping means is mounted on the body at the end of said rail member approaching a shoe member to be released.

22. A decelerator comprising a movable body, a brake rail member carried thereby and having a given length, a plurality of pairs of opposed brake shoe members, each pair spaced as closely adjacent as practicable and having a total length greater than that of said rail member, said rail member moving between said shoe members of said pairs along a specified path, said rail member length being an integral multiple of the distance between any point on one of said pairs of shoe members and the corresponding point on the adjacent pair, power means connected to move the shoe members of each of said pairs to a tripped position, cocking means connected to hold each of said shoe members in a cocked position against the potential energy of said power means, one pair of said cocking means for each of said pairs of shoes, means for conditioning selected pairs of cocking means for tripping thereof, and tripping means positioned to trip only the conditioned pairs of cocking means to release the connected pairs of shoe members from said cocked position when said rail member first arrives between a pair of shoe members to be released in a position where the released shoe members will apply sliding friction between opposite sides of said rail and the released shoe members, whereby controlled deceleration at a predetermined rate is attained in accordance with the number of shoe pairs released by said tripping means.

23. Apparatus in accordance with claim 22 wherein said tripping means is mounted on said body at the end of said rail approaching a shoe member pair to be released.

24. A decelerator comprising a body movable over a specified path, a brake rail of given length carried by said body and extending parallel to said path, a plurality of brake members spaced along said path the length of said rail in a position to apply friction to said rail as said rail moves past said brake members, and means for successively applying said brake members to said rail as said rail moves by said members.

25. Apparatus in accordance with claim 24 wherein the brake members are constructed to have substantially equal frictional effect on said rail, whereby when successively applied to said rail a substantially constant rate of deceleration of said body results.

26. Apparatus in accordance with claim 3 wherein the power means for each of said pairs of shoes is a floating hydraulic piston and cylinder assembly, one end of which is connected to move one of the shoes of its associated pair, and the other end of which is connected to move the other shoe of its associated pair.

27. Decelerator means for acting on a moving body carrying a brake rail, which comprises two pairs of spaced opposed brake shoes, said pairs being located in line to be entered by said brake rail and spaced center to center by exactly one brake rail length, power means for each pair connected to force together the brake shoes of each of said pairs to a tripped position, said tripped position being where sliding friction occurs between the shoes of a tripped pair and opposite sides of the enclosed rail, cocking means for each of said pairs movable to hold the shoes of said pair in a spaced relationship against the potential energy of said power means, and tripping means carried by said moving body, said tripping means being positioned to individually move each of said cocking means to trip its associated pair of shoes when the leading end of said rail enters such pair, so that said power means closes said tripped pair on said rail to decelerate said moving body, each of said cocking means comprising two rotatably mounted levers, each of said levers positioned to engage with a connecting member between its associated power means and one of the shoes of its associated pair to prevent said connecting member from moving in the direction to narrow the distance between said shoes, and each of said levers positioned to be contacted by said tripping means to move said levers simultaneously out of said engagement with their connecting members to trip their associated pair of brake shoes.

28. Decelerator means for acting on a moving body carrying a brake rail, which comprises two pairs of spaced opposed brake shoes, said pairs being located in line to be entered by said brake rail and spaced center to center by exactly one brake rail length, power means for each pair connected to force together the brake shoes of each of said pairs to a tripped position, said tripped position being where sliding friction occurs between the shoes of a tripped pair and opposite sides of the enclosed rail, cocking means for each of said pairs movable to hold the shoes of said pair in a spaced relationship against the potential energy of said power means, and tripping means carried by said moving body, said tripping means being positioned to individually move each of said cocking means to trip its associated pair of shoes when the leading end of said rail enters such pair, so that said power means closes said pair on said rail to decelerate said moving body, each of said cocking means comprising two rotatably mounted levers, each positioned to engage with a connecting member between its associated power means and one of the shoes of its associated pair to prevent said connecting member from moving in the direction to narrow the distance between said shoes, and a striker on each of said levers projecting beyond said lever in one direction, said striker being located to be contacted by said tripping means to move its respective lever out of said engagement with said connecting member to trip the two shoes of a pair simultaneously.

JOHN K. NORTHROP.
EDWARD C. DENZIN.
DONALD B. SMITH.

References Cited in the file of this patent

UNITED STATES PATENTS

| Number | Name | Date |
|---|---|---|
| 1,022,693 | Meyers | Apr. 9, 1912 |
| 1,576,623 | Barr | Mar. 16, 1926 |
| 1,806,994 | Fisher | May 26, 1931 |
| 1,827,162 | Miller | Oct. 13, 1931 |
| 1,840,250 | Prescott | Jan. 5, 1932 |
| 2,393,146 | Clark | Jan. 15, 1946 |
| 2,435,471 | Schmidt | Feb. 3, 1948 |